May 16, 1950 F. R. EICHNER 2,507,965
HINGE
Filed May 25, 1946

Inventor
Ferdinand R. Eichner
By Blackmore, Spencer & Flint
Attorneys

Patented May 16, 1950

2,507,965

UNITED STATES PATENT OFFICE 2,507,965

HINGE

Ferdinand R. Eichner, Pontiac, Mich., assignor to General Motors Corporation, Detroit, Mich., a corporation of Delaware Application May 25, 1946, Serial No. 672,307

5 Claims. (Cl. 16—150)

This invention relates to a hinge joint connection. It is of simple design and will enable low cost construction with a few easily produced parts.

While not limited to use on motor vehicles and other relatively short lived installations nor to lightweight closure doors, which are likely to be opened infrequently, it is especially feasible for such usage as, for example, for mounting the small door to the glove compartment of an automobile instrument panel or the inspection door of a coach destination sign or the emergency exit door of a passenger coach, or the loading door to the luggage storage space. In addition to accommodating swinging door travel the hinge structure functions as a seal against weather and dust and as a tensionable joint to keep the parts in close fitting rattleproof abutment.

In the preferred embodiment to be described the joining of the parts is throughout the length of their adjoining edges through a hinge strap inexpensively extruded or molded of rubber or other similar nonmetallic elastic deformable material. As preformed the rubber strip is conveniently of I-section in cross shape and has its opposite beaded edges fitted to longitudinal slots of T-shape in cross section in abutting portions of the closure door and its supporting structure. Of significance is the fact that the slots extend diagonally from adjoining corners of the door and its supporting structure so that in door closed position the two slots are divergently related and the rubber strip housed therein is bent at the apex of the angularly disposed slots and is placed under an elastic tension which tends to urge the door edge toward tight abutment with the mating edge of the supporting structure.

Figure 1:
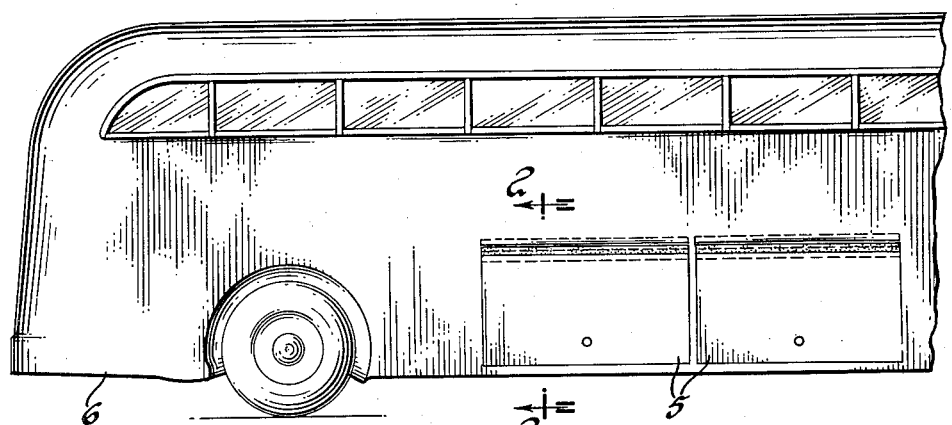
Figure 3:
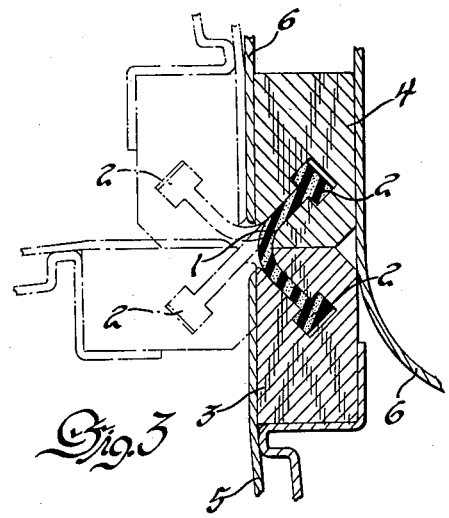
Figure 2:
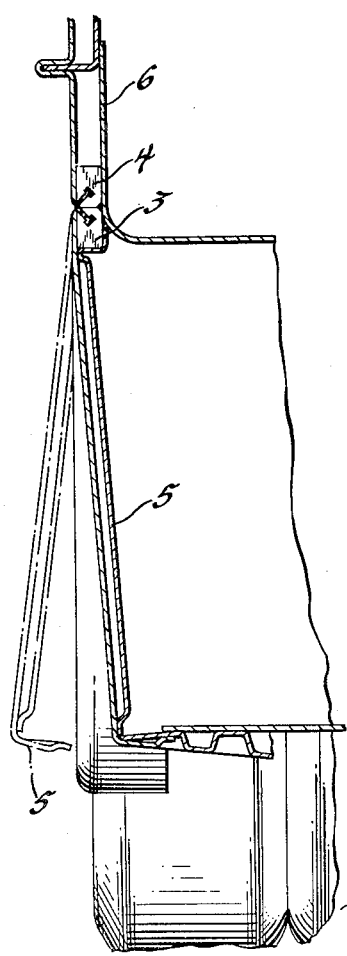
Figure 4:
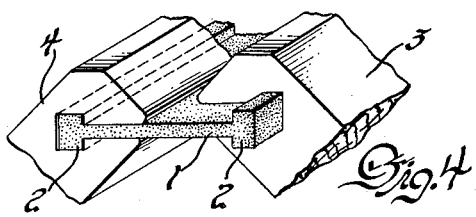

For a more detail explanation reference will be made to the accompanying drawing wherein, for the purpose of disclosure, Figure 1 illustrates an application of the invention to the baggage doors of a motor coach shown in side elevation; Figure 2 is a sectional view taken on line 2—2 of Figure 1 and Figure 3 is an enlarged sectional view and Figure 4 is a fragmentary perspective view, both of the hinge connection.

In the drawing it will be seen that the hinge connection is permitted by the flexibility of the rubber strip and it will be understood that the term "rubber" as used herein contemplates an elastic deformable material, whether of natural rubber or otherwise. As preformed the rubber strip I is a flat web terminating along opposite edges in enlarged heads or beads 2—2 so that in cross section it is of I-shape. The opposite beaded edges 2 are fitted or seated in interlocking relation with shouldered enlargements at the inner ends of substantially T-shaped slots formed respectively in adjacent rails 3 and 4 defining the boundaries of the closure door 5 and opening in the supporting structure 6. Each T-shaped slot extends diagonally inwardly from the outer corner adjacent its cooperating slot and in the closed position shown by full lines in Figure 3 and also in the fully opened broken line position the two slots are divergently related. In the dotted line open midposition illustrated the slots are in end to end alignment, which is also the position shown in Figure 4. For ease of assembly this is the relation in which the parts may be located when assembling inasmuch as the strip I is substantially in its extruded flat preformed shape and can, therefore, be threaded or slid with minimum effort through the aligned slots provided for its reception. This is especially the case when the slots are cut into wooden rails or if they are formed of fixedly mounted sheet metal stampings, Forming each T-shaped slot by means of separable complementary sheet metal stampings would, of course, enable the assembly without the telescopic type of interfitting referred to.

In swinging the door to closed position the intermediate portion of the rubber is bent to substantially V-shape in cross section and in addition to a natural tendency of the strip to return to its normally flat preformed shape there will be an additional tensioning stress imposed on the rubber if the proportions are properly predetermined when the abutting edges of the rails come into a floating fulcrum abutment to stretch the intermediate portion of the rubber between its spaced end fastenings. The reaction is to maintain the abutting rails in close fitting engagement and with sufficient resistance to avoid looseness and rattles.

In the case of a small lightweight door and especially if its pivotal axis is disposed vertically advantage may be taken of the elastic force above mentioned so as to swing the door to open position whenever the door is unlatched.

I claim:

1. In a construction of the character described, a pair of members arranged normally to be in coplanar relation and to be hinged together in tight edge to edge abutment, said members having in adjacent cornered edge portions, a pair of divergently related slots terminating in enlargements at their inner ends, the slot in each member extending diagonally from a corner thereof, and a tensioned hinge of elastic deformable material fitted to said divergently related slots with terminal beads interlockingly seating within said enlargements to maintain said elastic deformable material in stretched condition and thereby urge said tight abutment when said members are in coplanar relation.

2. In a construction of the character described, a pair of members to be hinged together for relative swinging adjustment to and from given coplanar relation with adjoining cornered edge portions in abutment, a connecting strip of elastic deformable material having a substantially V-shape in section when the members are in coplanar relation, with its apex at adjacent corners of said members, said members having divergently related pockets extending from said corners and terminating in shouldered enlargements, and enlarged beads on said strip, said strip being fitted to said pockets with said enlarged beads in interlocking relation with said shouldered enlargements for retaining the parts in assembly with the strip under elastic stress when said members are in coplanar relation.

3. In a hinged assembly, a closure member, a supporting member therefor, both members being provided with cooperating pockets which are divergently related when the closure member is in closed position, and a connecting hinge strip of elastic deformable material extending into said pockets and fastened to both the members at points spaced on opposite sides of its intermediate portion, said strip being proportioned and fitted to said members and pockets to effect bending and stressing of the intermediate portion of the strip when the closure is moved to closed position, and said strip being unstressed when said closure member is swung to open position in which said pockets are brought into alignment.

4. In combination, a supporting structure having an opening, a closure door therefor, both the supporting structure and the door having diagonally disposed slots extending inwardly from corners adjoining one another and arranged relatively to be in substantial alignment when the door is swung to given open position and to be divergent when the door is closed and a connecting hinge strip of elastic deformable material having its legs, which project oppositely from its central portion, housed within said slots and terminally joined to the supporting structure and the door respectively, said strip being preformed with said legs in alignment and free of tension stress and fitted to said diagonal slots for automatically setting up a tensional stress when the door is swung to closed position with said slots and the strip legs therein assuming divergent relation.

5. The structure of claim 4 wherein the slots and the strip extend throughout the length of the door with the strip forming a continuous seal between the hinged sides of the closure and supporting members.

FERDINAND R. EICHNER.

REFERENCES CITED

The following references are of record in the file of this patent:

UNITED STATES PATENTS

| Number | Name | Date |
|---|---|---|
| 243,405 | Rush | June 28, 1881 |
| 1,990,871 | Klocke | Feb. 12, 1935 |
| 2,210,652 | Dennett | Aug. 6, 1940 |